US008261606B2

(12) United States Patent  (10) Patent No.: US 8,261,606 B2
Oshiro  (45) Date of Patent: Sep. 11, 2012

(54) APPARATUS AND METHOD FOR DETECTING DECREASE IN TIRE AIR PRESSURE AND PROGRAM FOR DETECTING DECREASE IN TIRE AIR PRESSURE

(75) Inventor: Yuji Oshiro, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 273 days.

(21) Appl. No.: 12/569,634

(22) Filed: Sep. 29, 2009

(65) Prior Publication Data

US 2010/0126264 A1    May 27, 2010

(30) Foreign Application Priority Data

Nov. 26, 2008  (JP) ................................. 2008-300367
Jun. 4, 2009  (JP) ................................. 2009-135190

(51) Int. Cl.
*B60C 23/02*  (2006.01)
(52) U.S. Cl. ....................................................... 73/146.2
(58) Field of Classification Search ........................ None
See application file for complete search history.

(56) References Cited

U.S. PATENT DOCUMENTS

| | | | | |
|---|---|---|---|---|
| 5,343,741 A * | 9/1994 | Nishihara et al. | ............ | 73/146.2 |
| 5,561,415 A | 10/1996 | Dieckmann | | |
| 5,578,984 A * | 11/1996 | Nakajima | ..................... | 340/444 |
| 5,589,815 A * | 12/1996 | Nishihara et al. | ............. | 340/444 |
| 5,710,539 A * | 1/1998 | Iida | ............................... | 340/444 |
| 5,747,686 A * | 5/1998 | Nishihara et al. | ............ | 73/146.2 |
| 5,866,812 A * | 2/1999 | Nishihara et al. | ............ | 73/146.2 |
| 5,983,715 A * | 11/1999 | Nakajima | ..................... | 73/146.2 |
| 6,064,936 A * | 5/2000 | Nakajima | ........................ | 701/71 |
| 6,529,807 B2 * | 3/2003 | Sugisawa | ........................ | 701/29 |
| 2005/0012501 A1 * | 1/2005 | Isono et al. | ................... | 324/300 |
| 2006/0273657 A1 * | 12/2006 | Wanke et al. | ................. | 303/146 |
| 2007/0073494 A1 * | 3/2007 | Isono et al. | ..................... | 702/41 |
| 2011/0226049 A1 * | 9/2011 | Burgess et al. | ............ | 73/118.01 |
| 2011/0282532 A1 * | 11/2011 | Kosaka et al. | .................. | 701/22 |
| 2011/0282544 A1 * | 11/2011 | Oshiro | ........................... | 701/35 |

FOREIGN PATENT DOCUMENTS

| | | |
|---|---|---|
| EP | 2 103 454 A1 | 9/2009 |
| JP | 63-305011 A | 12/1988 |
| JP | 2003-165318 A | 6/2003 |
| JP | 2008-18940 A | 1/2008 |

\* cited by examiner

*Primary Examiner* — Andre Allen
(74) *Attorney, Agent, or Firm* — Birch, Stewart, Kolasch & Birch, LLP

(57) ABSTRACT

An apparatus includes a rotating wheel speed ratio calculation means for calculating, based on rotation velocity information, a rotating wheel speed ratio between front wheels and rear wheels of the vehicle; a wheel torque calculation means for calculating a wheel torque of the vehicle; an initialization means for obtaining a relation at a normal internal pressure between the wheel torque and the rotating wheel speed ratio between the front wheels and the rear wheels; a storage means for storing the relation obtained; a comparison means for comparing the rotating wheel speed ratio obtained by the rotating wheel speed ratio calculation means with the rotating wheel speed ratio at a normal internal pressure obtained from the wheel torque obtained by the wheel torque calculation means and the relation; and a judgment means for judging whether a tire air pressure is decreased or not based on a comparison result.

24 Claims, 9 Drawing Sheets

APPARATUS AND METHOD FOR DETECTING DECREASE IN TIRE AIR PRESSURE AND PROGRAM FOR DETECTING DECREASE IN TIRE AIR PRESSURE

BACKGROUND OF THE INVENTION

1. Field of the Invention

The present invention relates to an apparatus and a method for detecting a decrease in a tire air pressure, and a program for detecting a decrease in a tire air pressure.

2. Description of the Related Art

Conventionally, there has been an apparatus for detecting a decrease in a tire air pressure for detecting, based on the rotation (wheel speed) information regarding four tires attached to a vehicle, a decreased pressure of a tire. This apparatus uses a principle according to which a tire having a decreased pressure shows a reduced outer diameter (tire dynamic loaded radius) compared to that of tires having a normal air pressure and thus shows an increased rotation velocity and an increased angular velocity compared to those of other normal tires. In the case of a method of detecting a reduced internal pressure based on a relative difference in the angular velocity of tires (see Japanese Unexamined Patent Publication No. 305011/1988 for example) for example, a judgment value DEL obtained by DEL={(F1+F4)/2−(F2+F3)/2}/{(F1+F2+F3+F4)/4}×100(%) is used. In the formula, F1 to F4 represent angular velocities of a left front wheel tire, a right front wheel tire, a left rear wheel tire, and a right rear wheel tire, respectively.

However, since this method judges a decreased pressure based on the difference between the sum of angular velocities of two diagonally positioned tires of four wheels and the sum of angular velocities of the other two diagonally positioned tires, this method cannot judge a case where two front tires simultaneously have a decreased pressure or a case where two rear tires simultaneously have a decreased pressure. This causes a disadvantage where a driver continues to drive the vehicle while not knowing that the tires have a decreased pressure and thus the fuel consumption is deteriorated due to an increased rolling resistance of the tires and the tires may burst.

Thus, various methods have been suggested in order to judge a case where two front tires or two rear tires simultaneously have a decreased pressure as described above. In the case of Japanese Unexamined Patent Publication No. 2003-165318 for example, the rotation information of two front tires of a vehicle is compared with the rotation information of two rear tires to judge, based on the relation between the resultant comparison values and a predetermined threshold value, whether the two front tires or two rear tires simultaneously have a decreased pressure or not.

However, the conventional methods including the method according to Japanese Unexamined Patent Publication No. 2003-165318 are limited in that two front tires or two rear tires simultaneously having a decreased pressure can be detected only under limited vehicle running conditions. Specifically, the method according to Japanese Unexamined Patent Publication No. 2003-165318 judges that two front tires or two rear tires simultaneously have a decreased pressure only when the vehicle runs on a straight line and the tires are not driven or braked. Thus, this method cannot judge simultaneous decreased air pressure of two front tires or two rear tires when the vehicle is accelerated or decelerated.

SUMMARY OF THE INVENTION

The present invention has been made in view of the situation as described above. It is an objective of the present invention to provide an apparatus and a method for detecting a decrease in a tire air pressure, and a program for detecting a decrease in a tire air pressure by which simultaneous decreased air pressure of two front tires or two rear tires can be judged regardless of the vehicle speed.

An apparatus for detecting a decrease in a tire air pressure according to the first aspect of the present invention (hereinafter also may be simply referred to as "detection apparatus") is an apparatus for detecting a tire attached to a vehicle having a decreased air pressure, comprising:

a rotation velocity detection means for periodically detecting rotation velocities of tires of the respective wheels of the vehicle;

a rotating wheel speed ratio calculation means for calculating, based on rotation velocity information obtained from the rotation velocity detection means, a rotating wheel speed ratio between front wheels and rear wheels of the vehicle;

a wheel torque calculation means for calculating a wheel torque of the vehicle;

an initialization means for obtaining a relation at a normal internal pressure between the wheel torque and the rotating wheel speed ratio between the front wheels and the rear wheels;

a storage means for storing the relation obtained by the initialization means;

a comparison means for comparing the rotating wheel speed ratio obtained by the rotating wheel speed ratio calculation means with the rotating wheel speed ratio at a normal internal pressure obtained from the wheel torque obtained by the wheel torque calculation means and the relation stored in the storage means; and a judgment means for judging whether a tire air pressure is decreased or not based on a comparison result by the comparison means.

In the detection apparatus according to the first aspect of the present invention, attention is focused on a point that the rotating wheel speed ratio between the front wheels and the rear wheels has a correlation not with the vehicle speed but with the wheel torque. Thus, the initialization means is used to obtain, in advance, the relation at a normal internal pressure between the wheel torque and the rotating wheel speed ratio between the front wheels and the rear wheels. This relation is used to judge a decrease in the tire air pressure. Specifically, during the vehicle running after the initialization, the rotating wheel speed ratio between the front wheels and the rear wheels obtained from the wheel torque calculated by the wheel torque calculation means and the relation (rotating wheel speed ratio in the case of a normal internal pressure), and the rotating wheel speed ratio obtained by the rotating wheel speed ratio calculation means are compared. When the difference or ratio of the rotating wheel speed ratios is larger than a predetermined threshold value, it is judged that the two front tires or the two rear tires simultaneously have a decreased pressure. The above-mentioned correlation is established in both of a case where the vehicle is running at a fixed speed and a case where the vehicle is accelerated or decelerated. Thus, the two front tires or the two rear tires simultaneously having a decreased pressure can be detected without being limited by the vehicle speed.

The apparatus for detecting a decrease in a tire air pressure according to the first aspect can be configured so that:

the initialization means includes a means for obtaining a relation at a normal internal pressure between the wheel torque and the rotating wheel speed ratio between the front wheels and the rear wheels based on a regression line, and the comparison means compares the rotating wheel speed ratio obtained by the rotating wheel speed ratio calculation means with the rotating wheel speed ratio at a normal internal pressure obtained from the wheel torque obtained by the wheel torque calculation means and the regression line. In this case, the regression line can be used to obtain a rotating wheel speed ratio at a certain wheel torque. By comparing this rotating wheel speed ratio with the rotating wheel speed ratio obtained by the rotating wheel speed ratio calculation means, two wheels on the same axis having a decreased pressure can be detected.

The apparatus for detecting a decrease in a tire air pressure according to the first aspect can be configured so that:

the initialization means includes a means for setting a plurality of wheel torque regions and for calculating, at a normal internal pressure, an average value of the rotating wheel speed ratios between the front wheels and the rear wheels for the respective wheel torque regions, and the comparison means compares the rotating wheel speed ratio obtained by the rotating wheel speed ratio calculation means with an average value of the rotating wheel speed ratio in a wheel torque region including the wheel torque obtained by the wheel torque calculation means. In this case, by comparing the average value of the rotating wheel speed ratio in a wheel torque region including a certain wheel torque with the rotating wheel speed ratio obtained by the rotating wheel speed ratio calculation means, two wheels on the same axis having a decreased pressure can be detected. When the regression line is used, the existence of unique data has an influence on all wheel torque regions. However, if an average value of the rotating wheel speed ratios of the respective plurality of regions is used, it is advantageous that only a region including such unique data is adversely influenced by the existence of the unique data and other regions are not adversely influenced by the data.

The apparatus for detecting a decrease in a tire air pressure according to the first aspect can be configured so that:

the initialization means includes a means for setting a plurality of wheel torque regions and for calculating, at a normal internal pressure, an average wheel torque value of the respective wheel torque regions and an average value of the rotating wheel speed ratios between the front wheels and the rear wheels, and a means for obtaining a reference straight line connecting the average values of the respective regions, and the comparison means compares the rotating wheel speed ratio obtained by the rotating wheel speed ratio calculation means with the rotating wheel speed ratio at a normal internal pressure obtained from the wheel torque obtained by the wheel torque calculation means and the reference straight line. In this case, the reference straight line can be used to obtain the rotating wheel speed ratio at a certain wheel torque. By comparing the rotating wheel speed ratio with the rotating wheel speed ratio obtained by the rotating wheel speed ratio calculation means, two wheels on the same axis having a decreased pressure can be detected. When the regression line is used, the existence of unique data has an influence on all wheel torque region. However, the use of the reference straight line connecting average values of rotating wheel speed ratios of the respective plurality of regions is advantageous that only a region including such unique data is adversely influenced by the unique data and other regions are not adversely influenced by the data.

A detection apparatus according to the second aspect of the present invention is an apparatus for detecting a tire attached to a vehicle having a decreased air pressure, comprising:

a rotation velocity detection means for periodically detecting rotation velocities of tires of the respective wheels of the vehicle;

a rotating wheel speed ratio calculation means for calculating, based on rotation velocity information obtained from the rotation velocity detection means, a rotating wheel speed ratio between front wheels and rear wheels of the vehicle for a predetermined plurality of speed regions;

a wheel torque calculation means for calculating a wheel torque of the vehicle;

an initialization means for obtaining a relation at a normal internal pressure between the wheel torque and the rotating wheel speed ratio between the front wheels and the rear wheels for the respective speed regions;

a storage means for storing the relation obtained by the initialization means;

a comparison means for comparing, for the respective speed regions, the rotating wheel speed ratio obtained by the rotating wheel speed ratio calculation means with the rotating wheel speed ratio at a normal internal pressure obtained from the wheel torque obtained by the wheel torque calculation means and the relation stored in storage means; and a judgment means for judging whether a tire air pressure is decreased or not based on a comparison result by the comparison means.

In the detection apparatus according to the second aspect of the present invention, the initialization means is used to obtain, for the predetermined plurality of speed regions, a relation at a normal internal pressure between the wheel torque and the rotating wheel speed ratio between the front wheels and the rear wheels in advance. The relation is used to judge a decrease in the tire air pressure. Specifically, the relation between wheel torque and the rotating wheel speed ratio between the front wheels and the rear wheels obtained in advance for the respective plurality of speed regions is used to judge whether the two front tires or two rear tires simultaneously have a decreased pressure or not. Thus, even when types of tires are different between the front wheels and the rear wheels or when loads applied to the wheels are significantly different between the front wheels and the rear wheels, an influence by such differences varying depending on the speed (influence on the wheel rotation velocity) is considered to thereby improve the accuracy of detecting a pressure decrease.

The apparatus for detecting a decrease in a tire air pressure according to the second aspect can be configured so that:

the initialization means includes a means for obtaining, for the respective speed regions, a relation at a normal internal pressure between the wheel torque and the rotating wheel speed ratio between the front wheels and the rear wheels based on a regression line, and the comparison means compares, for the respective speed regions, the rotating wheel speed ratios obtained by the rotating wheel speed ratio calculation means with the rotating wheel speed ratio at a normal internal pressure obtained from the wheel torque obtained by the wheel torque calculation means and the regression line. In this case, the regression line obtained in advance for each speed region can be used to calculate a rotating wheel speed ratio at a certain wheel torque. By comparing this rotating wheel speed ratio with the rotating wheel speed ratio obtained by the rotating wheel speed ratio calculation means, two wheels on the same axis having a decreased pressure can be detected.

The apparatus for detecting a decrease in a tire air pressure according to the second aspect can be configured so that:

the initialization means includes a means for setting a plurality of wheel torque regions for the respective speed regions and for calculating, at a normal internal pressure, an average value of the rotating wheel speed ratios between the front wheels and the rear wheels for the respective wheel torque regions, and the comparison means compares, for the respective speed regions, the rotating wheel speed ratio obtained by the rotating wheel speed ratio calculation means with an average value of the rotating wheel speed ratios in a wheel torque region including the wheel torque obtained by the wheel torque calculation means. In this case, by comparing the average value of the rotating wheel speed ratios in a wheel torque region including a certain wheel torque that is calculated for the respective speed regions in advance with the rotating wheel speed ratio obtained by the rotating wheel speed ratio calculation means, two wheels on the same axis having a decreased pressure can be detected.

The apparatus for detecting a decrease in a tire air pressure according to the second aspect can be configured so that:

the initialization means includes a means for setting, for the respective speed regions, a plurality of wheel torque regions, and for calculating, at a normal internal pressure, an average value of wheel torques for the respective wheel torque regions and an average value of the rotating wheel speed ratios between the front wheels and the rear wheels, and a means for obtaining a reference straight line connecting the average values of the respective regions, and the comparison means compares, for the respective speed regions, the rotating wheel speed ratio obtained by the rotating wheel speed ratio calculation means with the rotating wheel speed ratio at a normal internal pressure obtained from the wheel torque obtained by the wheel torque calculation means and the reference straight line. In this case, the reference straight line obtained in advance for each speed region can be used to calculate a rotating wheel speed ratio at a certain wheel torque. By comparing the rotating wheel speed ratio with the rotating wheel speed ratio obtained by the rotating wheel speed ratio calculation means, two wheels on the same axis having a decreased pressure can be detected.

A method for detecting a decrease in a tire air pressure according to the third aspect of the present invention (hereinafter also may be simply referred to as "detection method") is a method for detecting a tire attached to a vehicle having a decreased air pressure, comprising:

a rotation velocity detection step of periodically detecting rotation velocities of tires of the respective wheels of the vehicle;

a rotating wheel speed ratio calculation step of calculating, based on rotation velocity information obtained in the rotation velocity detection step, a rotating wheel speed ratio between front wheels and rear wheels of the vehicle;

a wheel torque calculation step of calculating a wheel torque of the vehicle;

an initialization step of obtaining a relation at a normal internal pressure between the wheel torque and the rotating wheel speed ratio between the front wheels and the rear wheels;

a storage step of storing the relation calculated in the initialization step;

a comparison step of comparing the rotating wheel speed ratio with the rotating wheel speed ratio at a normal internal pressure obtained from the wheel torque and the stored relation; and a judgment step of judging whether a tire air pressure is decreased or not based on a comparison result obtained in the comparison step.

In the detection method according to the third aspect of the present invention, attention is focused on a point that the rotating wheel speed ratio between the front wheels and the rear wheels has a correlation not with the vehicle speed but with the wheel torque. Thus, the initialization step is used to obtain, in advance, the relation at a normal internal pressure between the wheel torque and the rotating wheel speed ratio between the front wheels and the rear wheels. This relation is used to judge a decrease in the tire air pressure. Specifically, during the vehicle running after the initialization, the rotating wheel speed ratio between the front wheels and the rear wheels obtained from the wheel torque calculated in the wheel torque calculation step and the relation (rotating wheel speed ratio in the case of a normal internal pressure), and the rotating wheel speed ratio obtained in the rotating wheel speed ratio calculation step are compared. When the difference or ratio of the rotating wheel speed ratios is larger than a predetermined threshold value, it is judged that the two front tires or the two rear tires simultaneously have a decreased pressure. The above-mentioned correlation is established in both of a case where the vehicle is running at a fixed speed and a case where the vehicle is accelerated or decelerated. Thus, the two front tires or the two rear tires simultaneously having a decreased pressure can be detected without being limited by the vehicle speed.

The method for detecting a decrease in a tire air pressure according to the third aspect can be figured so that:

the initialization step includes a step obtaining a relation at a normal internal pressure between the wheel torque and the rotating wheel speed ratio between the front wheels and the rear wheels based on a regression line, and the comparison step compares the rotating wheel speed ratio obtained in the rotating wheel speed ratio calculation step with the rotating wheel speed ratio at a normal internal pressure obtained from the wheel torque obtained in the wheel torque calculation step and the regression line.

The method for detecting a decrease in a tire air pressure according to the third aspect can be configured so that:

the initialization step includes an average value calculation step of setting a plurality of wheel torque regions and of calculating, at a normal internal pressure, an average value of the rotating wheel speed ratios between the front wheels and the rear wheels for the respective wheel torque regions, and the comparison step compares the rotating wheel speed ratio obtained in the rotating wheel speed ratio calculation step with an average value of the rotating wheel speed ratio in a wheel torque region including the wheel torque obtained in the wheel torque calculation step.

The method for detecting a decrease in a tire air pressure according to the third aspect can be configured so that:

the initialization step includes an average value calculation step of setting a plurality of wheel torque regions and of calculating, at a normal internal pressure, an average wheel torque value of the respective wheel torque regions and an average value of the rotating wheel speed ratios between the front wheels and the rear wheels, and a step of obtaining a reference straight line connecting the average values of the respective regions, and the comparison step compares the rotating wheel speed ratio obtained by the rotating wheel speed ratio calculation step with the rotating wheel speed ratio at a normal internal pressure obtained from the wheel torque obtained by the wheel torque calculation step and the reference straight line.

A detection method according to the fourth aspect of the present invention is a method for detecting a tire attached to a vehicle having a decreased air pressure, comprising:

a rotation velocity detection step of periodically detecting rotation velocities of tires of the respective wheels of the vehicle;

a rotating wheel speed ratio calculation step of calculating, based on rotation velocity information obtained in the rotation velocity detection step, a rotating wheel speed ratio between front wheels and rear wheels of the vehicle for a predetermined plurality of speed regions;

a wheel torque calculation step of calculating a wheel torque of the vehicle;

an initialization step of obtaining a relation at a normal internal pressure between the wheel torque and the rotating wheel speed ratio between the front wheels and the rear wheels for the respective speed regions;

a storage step of storing the relation obtained in the initialization step;

a comparison step of comparing, for the respective speed regions, the rotating wheel speed ratio with the rotating wheel speed ratio at a normal internal pressure obtained from the wheel torque and the stored relation; and a judgment step of judging whether a tire air pressure is decreased or not based on a comparison result in the comparison step.

In the detection method according to the fourth aspect of the present invention, the initialization step is used to obtain, for the predetermined plurality of speed regions, a relation at a normal internal pressure between the wheel torque and the rotating wheel speed ratio between the front wheels and the rear wheels in advance. The relation is used to judge a decrease in the tire air pressure. Specifically, the relation between wheel torque and the rotating wheel speed ratio between the front wheels and the rear wheels obtained in advance for the respective plurality of speed regions is used to judge whether the two front tires or two rear tires simultaneously have a decreased pressure or not. Thus, even when types of tires are different between the front wheels and the rear wheels or when loads applied to the wheels are significantly different between the front wheels and the rear wheels, an influence by such differences varying depending on the speed (influence on the wheel rotation velocity) is considered to thereby improve the accuracy of detecting a pressure decrease.

The method for detecting a decrease in a tire air pressure according to the fourth aspect can be configured so that:

the initialization step includes a step of calculating a relation for the respective speed regions at a normal internal pressure between the wheel torque and the rotating wheel speed ratio between the front wheels and the rear wheels based on a regression line, and the comparison step compares, for the respective speed regions, the rotating wheel speed ratio obtained in the rotating wheel speed ratio calculation step with the rotating wheel speed ratio at a normal internal pressure obtained from the wheel torque obtained in the wheel torque calculation step and the regression line.

The method for detecting a decrease in a tire air pressure according to the fourth aspect can be configured so that:

the initialization step includes an average value calculation step of setting a plurality of wheel torque regions for the respective speed regions and of calculating, at a normal internal pressure, an average value for the respective wheel torque regions of the rotating wheel speed ratios between the front wheels and the rear wheels, and the comparison step compares, for the respective speed regions, the rotating wheel speed ratio obtained in the rotating wheel speed ratio calculation step with an average value of the rotating wheel speed ratio in a wheel torque region including the wheel torque obtained in the wheel torque calculation step.

The method for detecting a decrease in a tire air pressure according to the fourth aspect can be configured so that:

the initialization step includes an average value calculation step of setting a plurality of wheel torque regions for the respective speed regions and of calculating, at a normal internal pressure, an average wheel torque value of the respective wheel torque regions and an average value of the rotating wheel speed ratios between the front wheels and the rear wheels and, a step of obtaining a reference straight line connecting the average values of the respective regions, and the comparison step compares, for the respective speed regions, the rotating wheel speed ratio obtained in the rotating wheel speed ratio calculation step with the rotating wheel speed ratio at a normal internal pressure obtained from the wheel torque obtained in the wheel torque calculation step and the reference straight line.

A program for detecting a decrease in a tire air pressure according to the fifth aspect of the present invention (hereinafter also may be simply referred to as "program") causes, in order to detect a decrease in an air pressure of a tire attached to a vehicle, a computer to function as: a rotating wheel speed ratio calculation means for calculating, based on rotation velocity information obtained from a rotation velocity detection means for periodically detecting rotation velocities of tires of the respective wheels of the vehicle, a rotating wheel speed ratio between front wheels and rear wheels of the vehicle; a wheel torque calculation means for calculating a wheel torque of the vehicle; an initialization means for obtaining a relation at a normal internal pressure between the wheel torque and the rotating wheel speed ratio between the front wheels and the rear wheels; a comparison means for comparing the rotating wheel speed ratio obtained by the rotating wheel speed ratio calculation means with the rotating wheel speed ratio at a normal internal pressure obtained from the wheel torque obtained by the wheel torque calculation means and the relation obtained by the initialization means; and a judgment means for judging whether a tire air pressure is decreased or not based on a comparison result by the comparison means.

The program for detecting a decrease in a tire air pressure according to the fifth aspect can be configured so that:

the initialization means includes a means for obtaining a relation at a normal internal pressure between the wheel torque and the rotating wheel speed ratio between the front wheels and the rear wheels based on a regression line, and the comparison means compares the rotating wheel speed ratio obtained by the rotating wheel speed ratio calculation means with the rotating wheel speed ratio at a normal internal pressure obtained from the wheel torque obtained by the wheel torque calculation means and the regression line.

The program for detecting a decrease in a tire air pressure according to the fifth aspect can be configured so that:

the initialization means includes a means for setting a plurality of wheel torque regions and for calculating, at a normal internal pressure, an average value of the rotating wheel speed ratios between the front wheels and the rear wheels for the respective wheel torque regions, and the comparison means compares the rotating wheel speed ratio obtained by the rotating wheel speed ratio calculation means with an average value of the rotating wheel speed ratio in a wheel torque region including the wheel torque obtained by the wheel torque calculation means.

The program for detecting a decrease in a tire air pressure according to the fifth aspect can be configured so that:

the initialization means includes a means for setting a plurality of wheel torque regions and for calculating, at a normal internal pressure, an average wheel torque value of the respective wheel torque regions and an average value of the rotating wheel speed ratios between the front wheels and the rear wheels, and a means for obtaining a reference straight line connecting the average values of the respective regions, and the comparison means compares the rotating wheel speed ratio obtained by the rotating wheel speed ratio calculation means with the rotating wheel speed ratio at a normal internal pressure obtained from the wheel torque obtained by the wheel torque calculation means and the reference straight line.

A program according to the sixth aspect of the present invention causes, in order to detect a decrease in an air pressure of a tire attached to a vehicle, a computer to function as: a rotating wheel speed ratio calculation means for calculating, based on rotation velocity information obtained from a rotation velocity detection means for periodically detecting rotation velocities of tires of the respective wheels of the vehicle, a rotating wheel speed ratio between front wheels and rear wheels of the vehicle for a predetermined plurality of speed regions; a wheel torque calculation means for calculating a wheel torque of the vehicle; an initialization means for obtaining a relation at a normal internal pressure between the wheel torque and the rotating wheel speed ratio between the front wheels and the rear wheels for the respective speed regions; a comparison means for comparing, for the respective speed regions, the rotating wheel speed ratio obtained by the rotating wheel speed ratio calculation means with the rotating wheel speed ratio at a normal internal pressure obtained from the wheel torque obtained by the wheel torque calculation means and the relation obtained by the initialization means; and a judgment means for judging whether a tire air pressure is decreased or not based on a comparison result by the comparison means.

The program for detecting a decrease in a tire air pressure according to the sixth aspect can be configured so that:

the initialization means includes a means for obtaining, for the respective speed regions, a relation at a normal internal pressure between the wheel torque and the rotating wheel speed ratio between the front wheels and the rear wheels based on a regression line, and the comparison means compares, for the respective speed regions, the rotating wheel speed ratio obtained by the rotating wheel speed ratio calculation means with the rotating wheel speed ratio at a normal internal pressure obtained from the wheel torque obtained by the wheel torque calculation means and the regression line.

The program for detecting a decrease in a tire air pressure according to the sixth aspect can be configured so that:

the initialization means includes a means for setting a plurality of wheel torque regions for the respective speed regions and for calculating, at a normal internal pressure, an average value of the rotating wheel speed ratios between the front wheels and the rear wheels for the respective wheel torque regions and, the comparison means compares, for the respective speed regions, the rotating wheel speed ratio obtained by the rotating wheel speed ratio calculation means with an average value of the rotating wheel speed ratio in a wheel torque region including the wheel torque obtained by the wheel torque calculation means.

The program for detecting a decrease in a tire air pressure according to the sixth aspect can be configured so that:

the initialization means includes a means for setting, for the respective speed regions, a plurality of wheel torque regions and for calculating, at a normal internal pressure, an average value of wheel torques for the respective wheel torque regions and an average value of the rotating wheel speed ratios between the front wheels and the rear wheels, and a means for obtaining a reference straight line connecting the average values of the respective regions, and, the comparison means compares, for the respective speed regions, the rotating wheel speed ratio obtained by the rotating wheel speed ratio calculation means with the rotating wheel speed ratio at a normal internal pressure obtained from the wheel torque obtained by the wheel torque calculation means and the reference straight line.

DETAILED DESCRIPTION

Hereinafter, with reference to the attached drawings, an embodiment of a detection apparatus and method, and a program for detecting a decrease in a tire air pressure of the present invention will be described in detail.

First Embodiment

Figure 1:
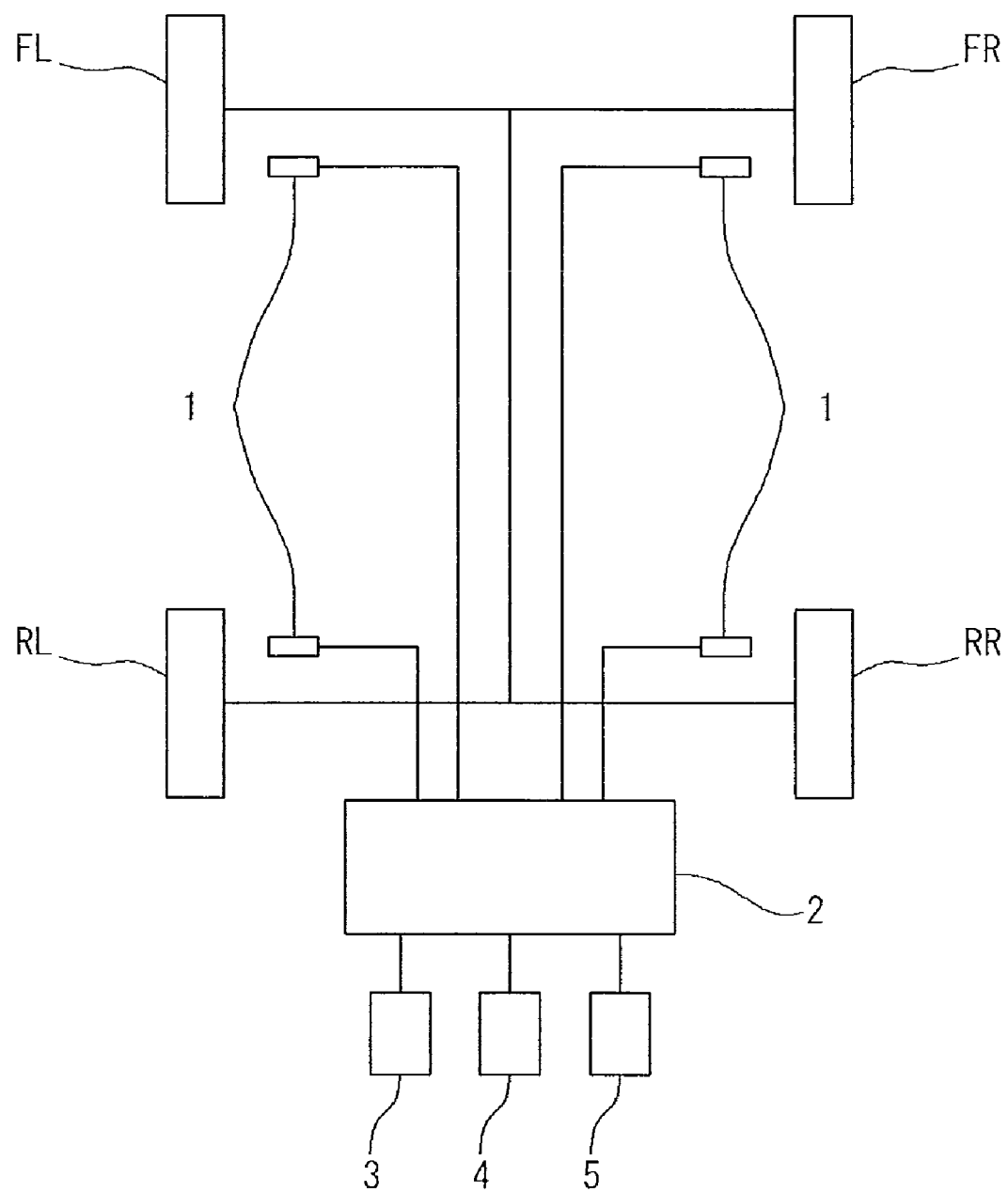
FIG. 1 is a block diagram illustrating one embodiment of a detection apparatus of the present invention.

As shown in FIG. 1, a detection apparatus according to the first embodiment of the present invention includes a normal wheel speed detection means (rotation velocity detection means) 1 in order to detect the rotation velocities of four tires provided in a four-wheel vehicle (a left front wheel (FL), a right front wheel (FR), a left rear wheel (RL), and a right rear wheel (RR)). The normal wheel speed detection means (rotation velocity detection means) 1 is provided to be associated with the respective tires.

The wheel speed detection means 1 may be, for example, a wheel speed sensor that uses an electromagnetic pickup for example to generate a rotation pulse to measure an angular velocity and a wheel speed based on the number of pulses or an angular velocity sensor such as the one that generates power using rotation as in a dynamo to measure an angular velocity and a wheel speed based on this voltage. The output from the wheel speed detection means 1 is given to a control unit 2 that is a computer such as ABS. This control unit 2 is connected to a display unit 3 composed of a liquid crystal display element, a plasma display element or CRT for example for displaying a tire having a decreased internal pressure, an initialization button 4 that can be operated by a driver, and an alarming unit 5 for notifying a driver of a tire having a decreased internal pressure.

Figure 2:
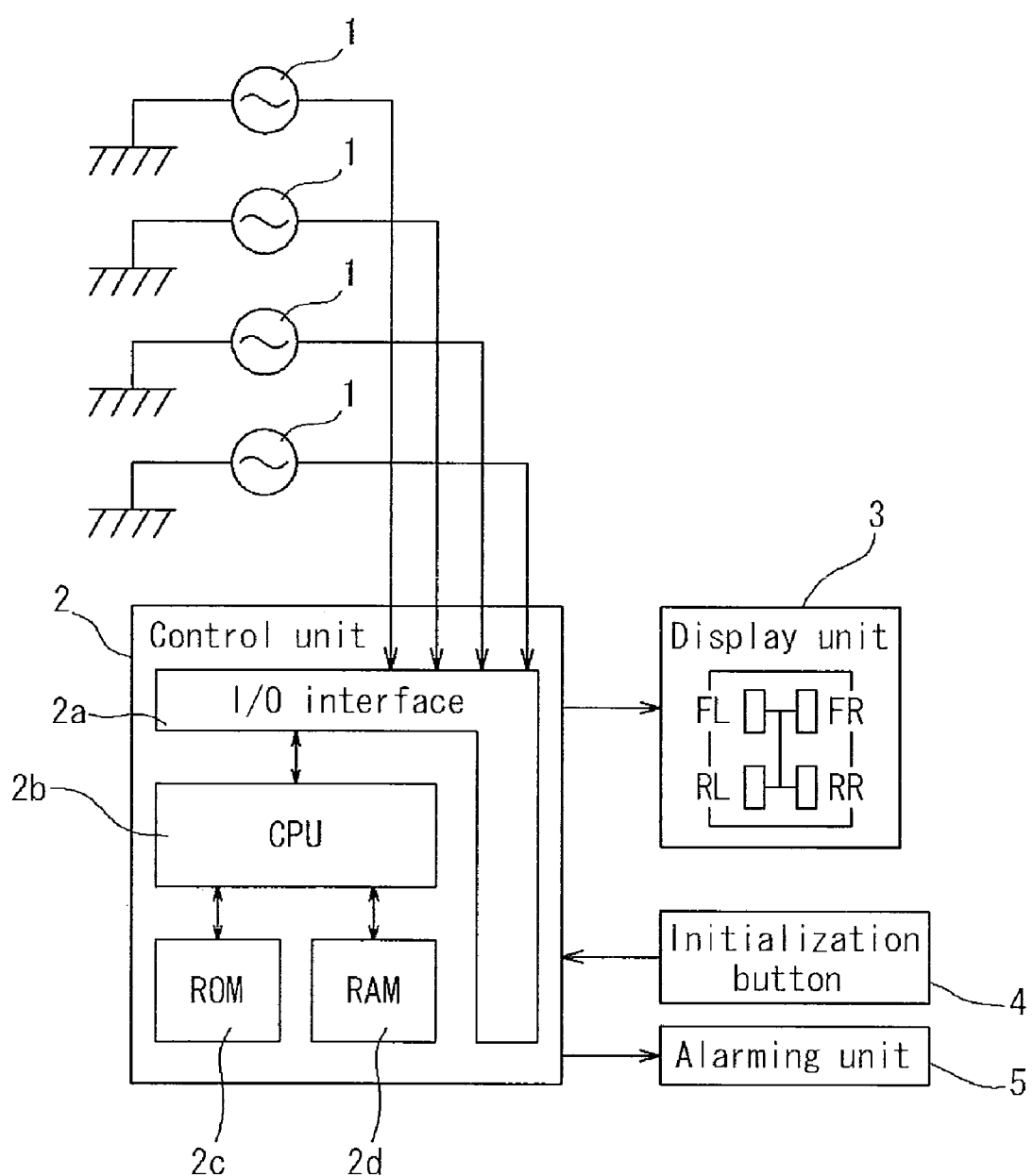
FIG. 2 is a block diagram illustrating an electric configuration of the detection apparatus shown in FIG. 1.

As shown in FIG. 2, the control unit 2 is composed of: an I/O interface 2a required for the exchange of a signal with an external apparatus; a CPU 2b functioning as a computation processing center; a ROM 2c storing therein a control operation program of this CPU 2b; and a RAM 2d to which data is temporarily written when the CPU 2b performs a control operation or from which the written data is read out.

The wheel speed detection means 1 outputs a pulse signal corresponding to the rotation number of a tire (hereinafter also referred to as "wheel speed pulse"). The CPU 2b calculates, based on the wheel speed pulse outputted from the wheel speed detection means 1, angular velocities of the respective tires at every predetermined sampling cycle $\Delta T$ (sec) (e.g., $\Delta T$-0.05 second).

The detection apparatus according to the first embodiment is composed of: a wheel speed detection means (rotation velocity detection means) 1 for periodically detecting the tire rotation velocities of the respective wheels of the vehicle; a rotating wheel speed ratio calculation means for calculating, based on the rotation velocity information obtained from the rotation velocity detection means, a rotating wheel speed ratio between the front wheels and the rear wheels of the vehicle; a wheel torque calculation means for calculating the vehicle wheel torque; an initialization means for obtaining a relation at a normal internal pressure between the wheel torque and the rotating wheel speed ratio between the front wheels and the rear wheels; a storage means for storing the relation obtained by the initialization means; a comparison means for comparing the rotating wheel speed ratio obtained by the rotating wheel speed ratio calculation means with the rotating wheel speed ratio at a normal internal pressure obtained based on the wheel torque obtained from the wheel torque calculation means and the relation stored in the storage means; and a judgment means for judging whether the tire air pressure is decreased or not based on the comparison result by the comparison means. The program for detecting a decrease in a tire air pressure causes the control unit 2 to function as the rotating wheel speed ratio calculation means, the wheel torque calculation means, the initialization means, the comparison means, and the judgment means.

In the present invention, the apparatus is initialized while tires having a predetermined air pressure (normal pressure) being attached to the vehicle. The result thereof is stored in the RAM 2d (the storage means) of the control unit 2. This initialization is performed by the CPU 2b functioning as the initialization means. Specifically, based on the rotation velocity information of the respective tires of the vehicle obtained from the wheel speed detection means 1, the rotating wheel speeds of the respective four wheel tires are calculated. Then, based on these rotating wheel speeds, the rotating wheel speed ratio (DEL) between the front wheels and the rear wheels is calculated based on, for example, $$DEL=\{(FL+FR)/(RL+RR)-1\}\times 100(\%) \quad (1).$$

In this formula, FL, FR, RL, and RR represent the rotating wheel speeds of the left front tire, the right front tire, the left rear tire, and the right rear tire, respectively. The formula for calculating DEL is not limited to the formula (1) and also can be, for example, the following formula of:

$$DEL=\{(FL+FR)/2-(RL+RR)/2\{/\}(FL+FR+RL+RR)/4\}\times 100(\%) \quad (2)$$

The wheel torque can be derived from the engine torque (T) and the rotation number (R) obtained from an engine control apparatus for example. For example, the wheel torque (WT) per one drive wheel can be represented by the following formula (3).

$$WT=(T\times R)/\text{rotation number of driven wheel/the number of drive wheels} \quad (3)$$

In this formula (3), (R/rotation number of drive wheel) can be calculated from a gear ratio or a shift position (which means L, 2, and 3 ... of a variable speed gear of a vehicle) and, in the case of an automatic vehicle, there can be known as to which gear is used to run the vehicle. If the respective gear ratios are stored in the storage means in advance, only the shift position is sufficient to know (R/rotation number of drive wheel)).

Figure 7:
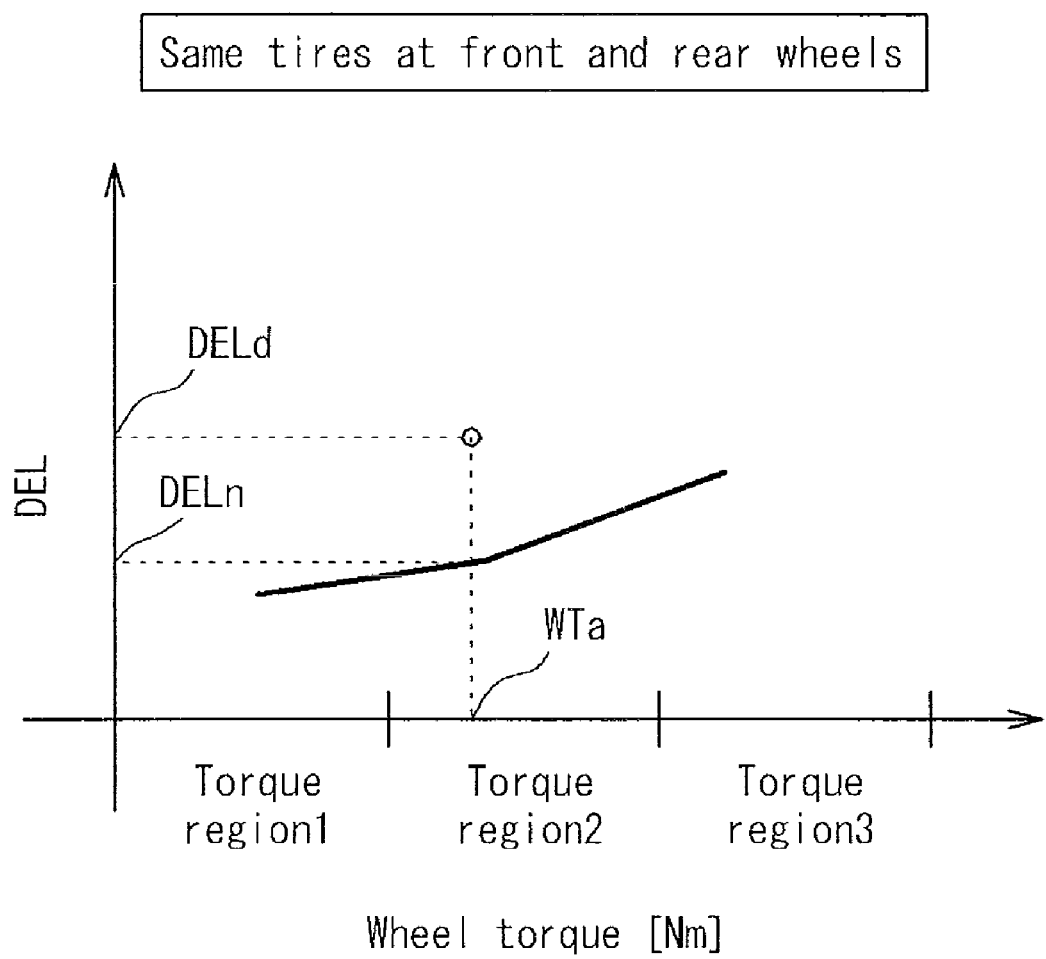
FIG. 7 shows the relation between the DEL and the wheel torque when front wheels and rear wheels have the same tires.

Then, the storage means stores therein the relation between the rotating wheel speed ratio between the front wheels and the rear wheels calculated in the manner as described above and the wheel torque. This relation can be obtained in the manner as described below for example. Any of the following relations shown in FIG. 3, FIG. 5, and FIG. 7 is a relation obtained when the same tires are attached to the front wheels and the rear wheels.

Figure 3:
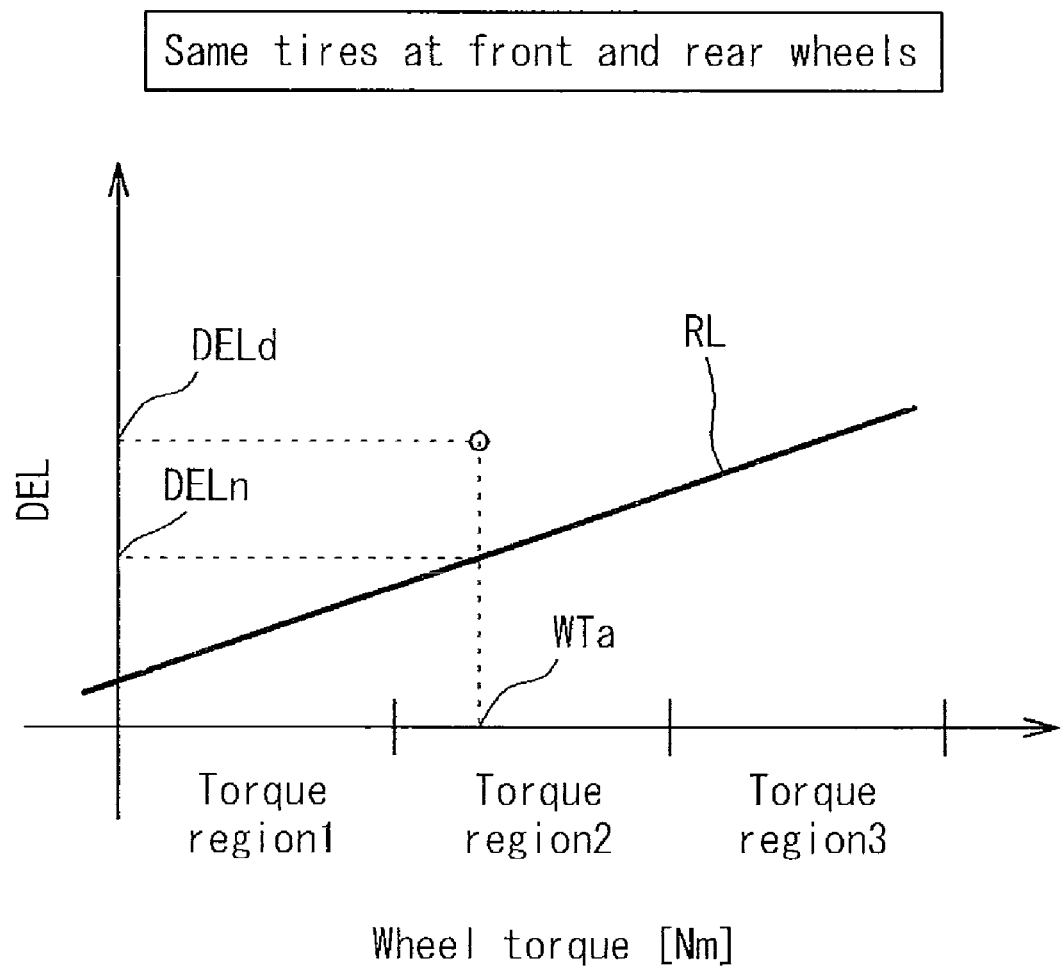
FIG. 3 shows the relation between the DEL and the wheel torque when front wheels and rear wheels have the same tires.

FIG. 3 shows the relation between the wheel torque and the rotating wheel speed ratio (DEL) between the front wheels and the rear wheels obtained during the initialization. A regression line RL at a normal internal pressure is obtained by the least-square method for example, based on the rotating wheel speed ratio data accumulated by the predetermined number and the wheel torque data.

Figure 5:
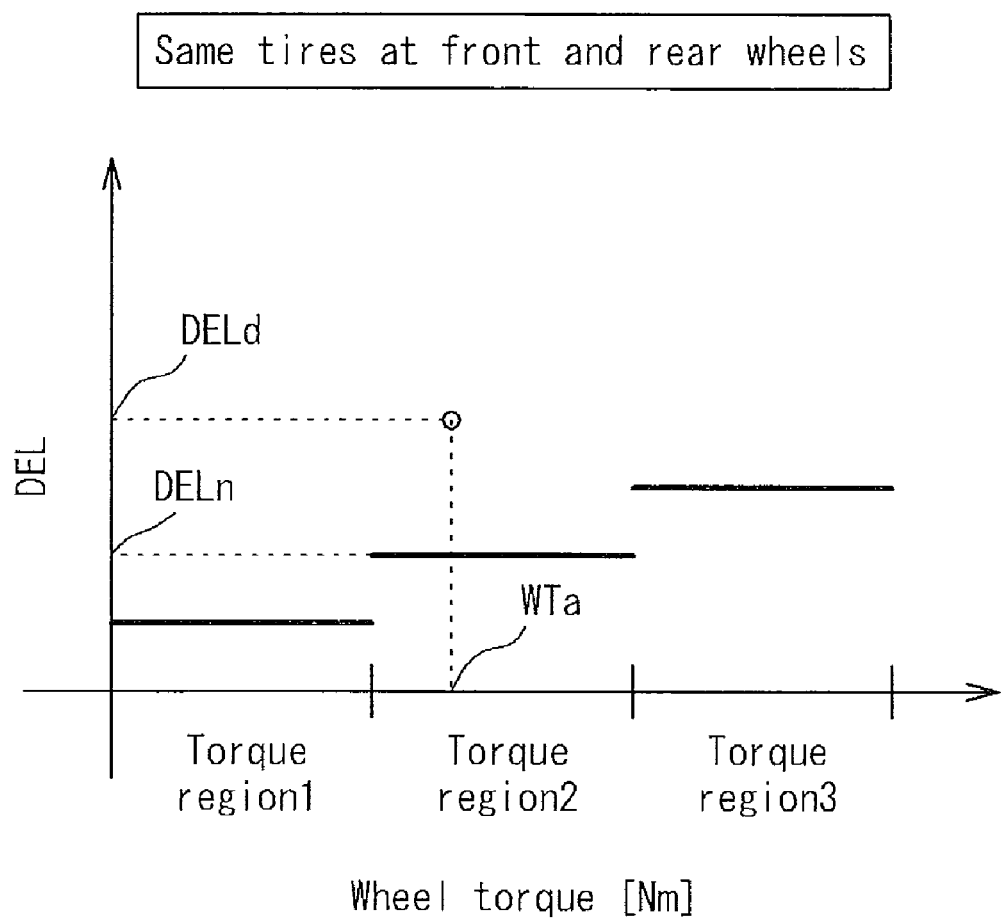
FIG. 5 shows the relation between the DEL and the wheel torque when front wheels and rear wheels have the same tires.

In the example shown in FIG. 5, the wheel torque is divided into three regions to calculate, with regard to the rotating wheel speed ratio data and the wheel torque data included in each region, an average value of the rotating wheel speed ratio between the front wheels and the rear wheels regarding each region.

In the example shown in FIG. 7, the wheel torque is divided into three regions to calculate, with regard to the rotating wheel speed ratio data and the wheel torque data included in each region, an average value of the rotating wheel speed ratio between the front wheels and the rear wheels regarding each region to subsequently calculate a reference straight line connecting the average values of the respective regions. Although the wheel torque is divided into three regions in FIG. 5 or FIG. 7, the wheel torque also may be divided into two regions or four or more regions.

In the case of FIG. 3, a wheel torque calculated during the running after the initialization is assumed as WTa and a rotating wheel speed ratio between the front wheels and the rear wheels is assumed as DELd. Based on the regression line RL obtained at the initialization, the rotating wheel speed ratio DELn between the front wheels and the rear wheels at the normal internal pressure when the wheel torque is WTa is calculated. Then, DELd is compared with DELn and, when the difference or ratio thereof is larger than the predetermined threshold value, it is judged that the two front tires or two rear tires simultaneously have a decreased pressure.

In the case of FIG. 5, when the calculated wheel torque is assumed as WTa and the rotating wheel speed ratio between the front wheels and the rear wheels is assumed as DELd, based on the average value of DELs in the respective torque regions that is obtained in advance, the rotating wheel speed ratio DELn between the front wheels and the rear wheels at a normal internal pressure when the wheel torque is WTa is calculated. Then, DELd is compared with DELn and, when the difference or ratio thereof is larger than the predetermined threshold value, it is judged that the two front tires or two rear tires simultaneously have a decreased pressure.

In the case of FIG. 7, when the calculated wheel torque is assumed as WTa and the rotating wheel speed ratio between the front wheels and the rear wheels is assumed as DELd, based on the reference straight line connecting the average values of DELs in the respective torque regions that are calculated in advance, the rotating wheel speed ratio DELn between the front wheels and the rear wheels at the normal internal pressure when the wheel torque is WTa is calculated. Then, DELd is compared with DELn and, when the difference or ratio thereof is larger than the predetermined threshold value, it is judged that the two front tires or two rear tires simultaneously have a decreased pressure.

Second embodiment

The relation between the wheel torque and the rotation velocity ratio between the front wheels and the rear wheels shows, when the same tires are attached to the vehicle and when a difference among loads applied to the front wheel tires and the rear wheel tires is small, a substantially one straight line regardless of the vehicle speed, as shown in FIG. 3. Thus, if such a straight line (regression line) is obtained in the initialization step performed at the normal internal pressure and this straight line is stored, the two front tires or two rear tires simultaneously having a decreased pressure can be judged based on a deviation from the straight line.

However, when different tires are attached to the front wheels and the rear wheels and when loads applied to the from wheels and the rear wheels are greatly different even if the same tires attached to the front wheels and the rear wheels (e.g., when a heavy baggage is loaded in the trunk), the tire swells due to the centrifugal force of the tires to a different level depending on the vehicle speed. Thus, the relation between the wheel torque and the rotation velocity ratio between the front wheels and the rear wheels does not show a single straight line. This prevents, when a single straight line is forcedly calculated and a decreased pressure is tried to be calculated based on this straight line, an alarm from being issued despite of the existence of a decreased pressure (no alarm) or this causes an alarm to be issued despite of the existence of a normal internal pressure (false alarm).

Figure 4:
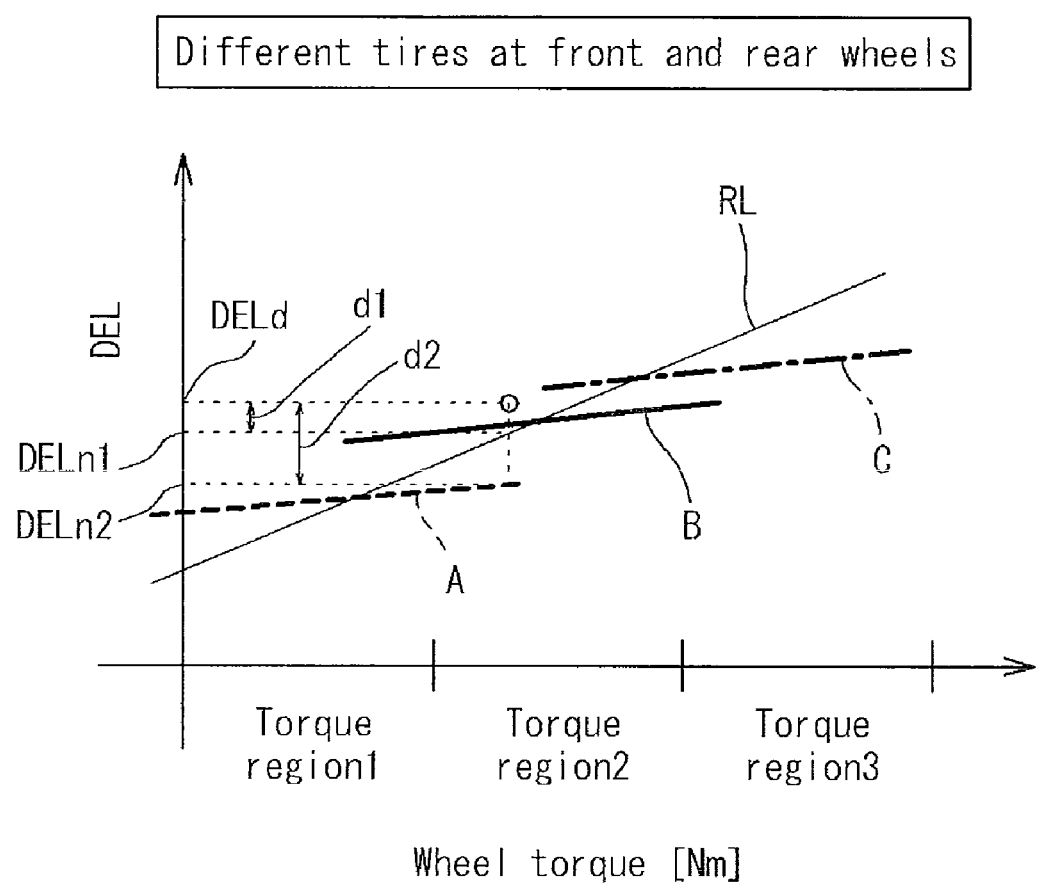
FIG. 4 shows the relation between the DEL and the wheel torque when front wheels and rear wheels have different tires.

FIG. 4 is a schematic view illustrating the relation between the wheel torque and the rotation velocity ratio between the front wheels and the rear wheels when different tires are attached to the front wheels and the rear wheels. In FIG. 4, a thin solid line shows the regression line RL calculated based on the data obtained for all vehicle speeds, a thick broken line A shows the regression line calculated based on the data obtained in the low-speed region (e.g., region up to 100 km/h), a thick solid line B shows the regression line calculated based on the data obtained in the medium-speed region (e.g., region from 100 to 150 km/h), and a thick alternate long and short dash line C shows the regression line calculated based on the data obtained in the high-speed region (e.g., region from 150 to 200 km/h). DELd shows a rotation velocity ratio between the front wheels and the rear wheels at a certain speed when both of the two front wheels have a 30%-decreased pressure.

As shown in FIG. 4, when one regression line is calculated regardless of the vehicle speed, a difference d1 between the rotation velocity ratio DELn1 between the front wheels and the rear wheels at a normal pressure that is calculated based on this regression line and the rotation velocity ratio DELd between the front wheels and the rear wheels when the two front tires have a 30%-decreased pressure is small. Thus, it is not judged that the two tires have a decreased pressure and no alarm is issued. In contrast with this, when the regression line (regression line shown by the thick broken line A) calculated in each speed region is used, a difference d2 between the rotation velocity ratio DELn2 between the front wheels and the rear wheels at a normal internal pressure that is calculated based on this regression line and the rotation velocity ratio DELd between the front wheels and the rear wheels when the two front tires have a 30%-decreased pressure is large. Thus, it can be judged that the two tires have a decreased pressure.

Figure 6:
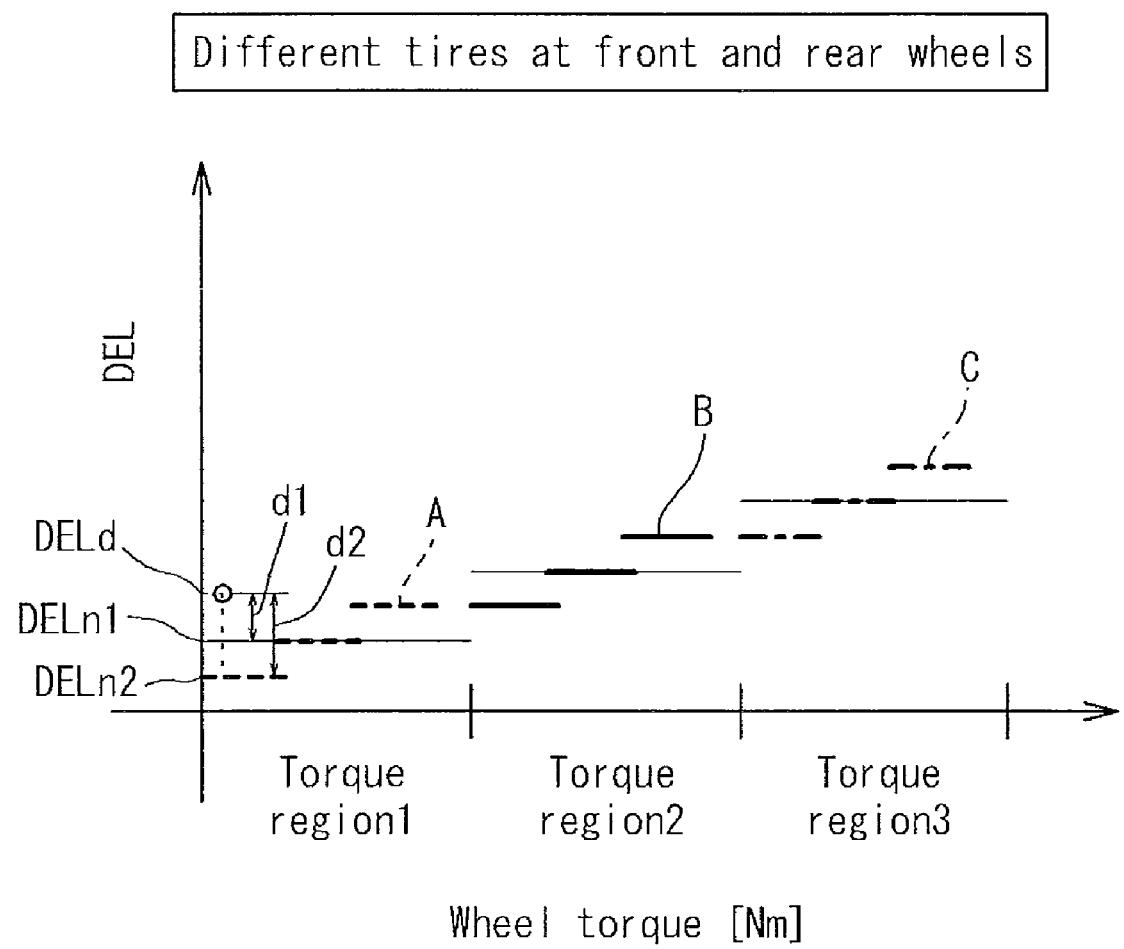
FIG. 6 shows the relation between the DEL and the wheel torque when front wheels and rear wheels have different tires.

FIG. 6 is a schematic view as in FIG. 4 that shows the relation between the wheel torque and the rotation velocity ratio between the front wheels and the rear wheels when different types of tires are attached to the front wheels and the rear wheels. In FIG. 6, the thin solid line shows one average line of the respective wheel torque regions calculated in all speed regions (a straight line connecting average values of the rotation velocity ratio between the front wheels and the rear wheels). The thick broken line A shows an average line connecting average values of the respective wheel torque regions calculated based on the data obtained in the low-speed region (e.g., region up to 100 km/h). The thick solid line B shows an average line connecting average values of the respective wheel torque regions calculated based on the data obtained in the medium-speed region (e.g., region from 100 to 150 km/h). The thick alternate long and short dash line C shows an average line connecting average values of the respective wheel torque regions calculated based on the data obtained in the high-speed region (e.g., region from 150 to 200 km/h). DELd shows a rotation velocity ratio between the front wheels and the rear wheels at a certain speed when both of the two front wheels have a 30%-decreased pressure.

As shown in FIG. 6, when one average line is calculated for the respective wheel torque regions regardless of the vehicle speed, a difference d1 between the rotation velocity ratio DELn1 between the front wheels and the rear wheels at a normal internal pressure that is calculated based on this average line and the rotation velocity ratio DELd between the front wheels and the rear wheels when the two front tires have a 30%-decreased pressure is small. Thus, it is not judged that the tires have a decreased pressure and no alarm is issued. On the contrary, when an average line calculated in the respective speed regions (a straight line shown by the thick broken line A) is used, a difference d2 between the rotation velocity ratio DELn2 between the front wheels and the rear wheels at a normal internal pressure that is calculated based on this average line and the rotation velocity ratio DELd between the front wheels and the rear wheels when the two front tires have a 30%-decreased pressure is large. Thus, it can be judged that the tires have a decreased pressure.

Figure 8:
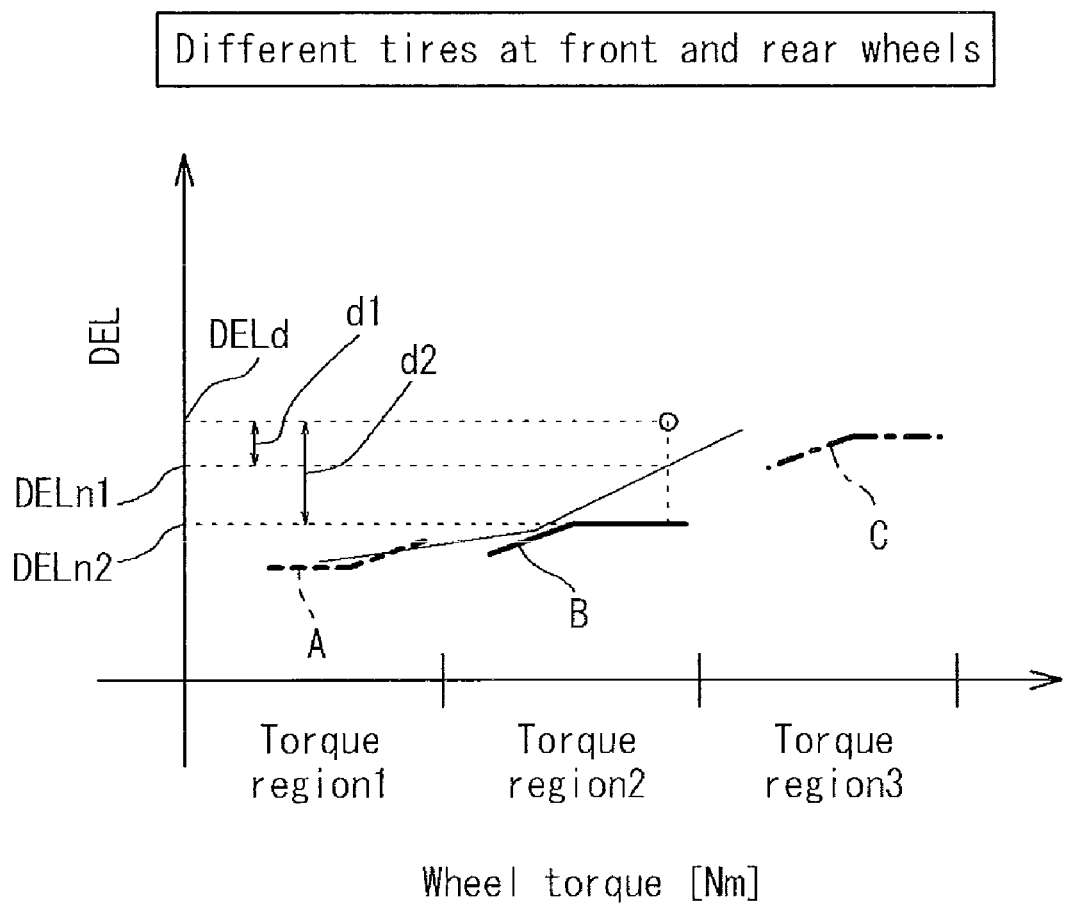
FIG. 8 shows the relation between the DEL and the wheel torque when front wheels and rear wheels have different tires.

FIG. 8 shows, as in FIG. 4, the relation between the wheel torque and the rotation velocity ratio between the front wheels and the rear wheels when different types of tires are attached to the front wheels and the rear wheels. In FIG. 8, the thin solid line shows an average line connecting the average values of the respective wheel torque regions calculated in all speed regions (average values of rotation velocity ratios between the front wheels and the rear wheels). The thick broken line A shows an average line connecting average values of the respective wheel torque regions calculated based on the data obtained in the low-speed region (e.g., region up to 100 km/h). The thick solid line B shows an average line connecting average values of the respective wheel torque regions calculated based on the data obtained in the medium-speed region (e.g., region from 100 to 150 km/h). The thick alternate long and short dash line C shows an average line connecting average values of the respective wheel torque regions calculated based on the data obtained in the high-speed region (e.g., region from 150 to 200 km/h). DELd shows the rotation velocity ratio between the front wheels and the rear wheels at a certain speed when both of the two front wheels have a 30%-decreased pressure.

As shown in FIG. 8, when one average line connecting the average values of the respective wheel torque regions is calculated regardless of the vehicle speed, a difference d1 between the rotation velocity ratio DELn1 between the front wheels and the rear wheels at a normal internal pressure that is calculated by this average line and the rotation velocity ratio DELd between the front wheels and the rear wheels when the two front tires have a 30%-decreased pressure is small. Thus, it is not judged that the tires have a decreased pressure and no alarm is issued. In contrast with this, when the average line connecting the average values of the respective wheel torque regions in the respective speed regions (the straight line shown by the thick broken line A) is used, a difference d2 between the rotation velocity ratio DELn2 between the front wheels and the rear wheels at a normal internal pressure that is calculated based on this average line and the rotation velocity ratio DELd between the front wheels and the rear wheels when the two front tires have a 30%-decreased pressure is large. Thus, it can be judged that the tires have a decreased pressure.

The detection apparatus according to the second embodiment is composed of, as in the above-described first embodiment, the wheel speed detection means (rotation velocity detection means) 1 for periodically detecting the tire rotation velocities of the respective wheels of the vehicle; the rotating wheel speed ratio calculation means for calculating, based on the rotation velocity information obtained from this rotation velocity detection means, a rotating wheel speed ratio between the front wheels and the rear wheels of the vehicle for a predetermined plurality of speed regions; the wheel torque calculation means for calculating the vehicle wheel torque; the initialization means for obtaining, in the respective speed regions, a relation at a normal internal pressure between the wheel torque and the rotating wheel speed ratio between the front wheels and the rear wheels; the storage means for storing the relation obtained by this initialization means; the comparison means for comparing, in the respective speed regions, the rotating wheel speed ratio obtained by the rotating wheel speed ratio calculation means with the rotating wheel speed ratio at a normal internal pressure obtained based on the wheel torque obtained from the wheel torque calculation means and the relation stored in the storage means; and the judgment means for judging whether the tire air pressure is decreased or not based on the comparison result by the comparison means. The program for detecting a decrease in a tire air pressure causes the control unit 2 to function as the rotating wheel speed ratio calculation means, the wheel torque calculation means, the initialization means, the comparison means, and the judgment means.

Also in this second embodiment, the formula (1) or the formula (2) for example can be used to calculate the rotating wheel speed ratio (DEL) between the front wheels and the rear wheels. The formula (3) also can be used to calculate the wheel torque (WT) per one drive wheel.

EXAMPLE

Next, the following section will describe an example of the detection method of the present invention. However, the present invention is not limited to such an example only.

Example 1

A running test was performed using an FF vehicle. The FF vehicle was fitted with tires of the size of 205/60R16 and two persons including a driver were in the vehicle. The running conditions were set so that the vehicle ran at a different speed on a general road so that the wheel torque value can be dispersed at a normal internal pressure to calculate an effective regression line. Next, the vehicle was caused to run at a fixed speed while both of the two front tires (left front wheel (FL) and right front wheel (FR)) had a 30%-decreased pressure.

Figure 9:
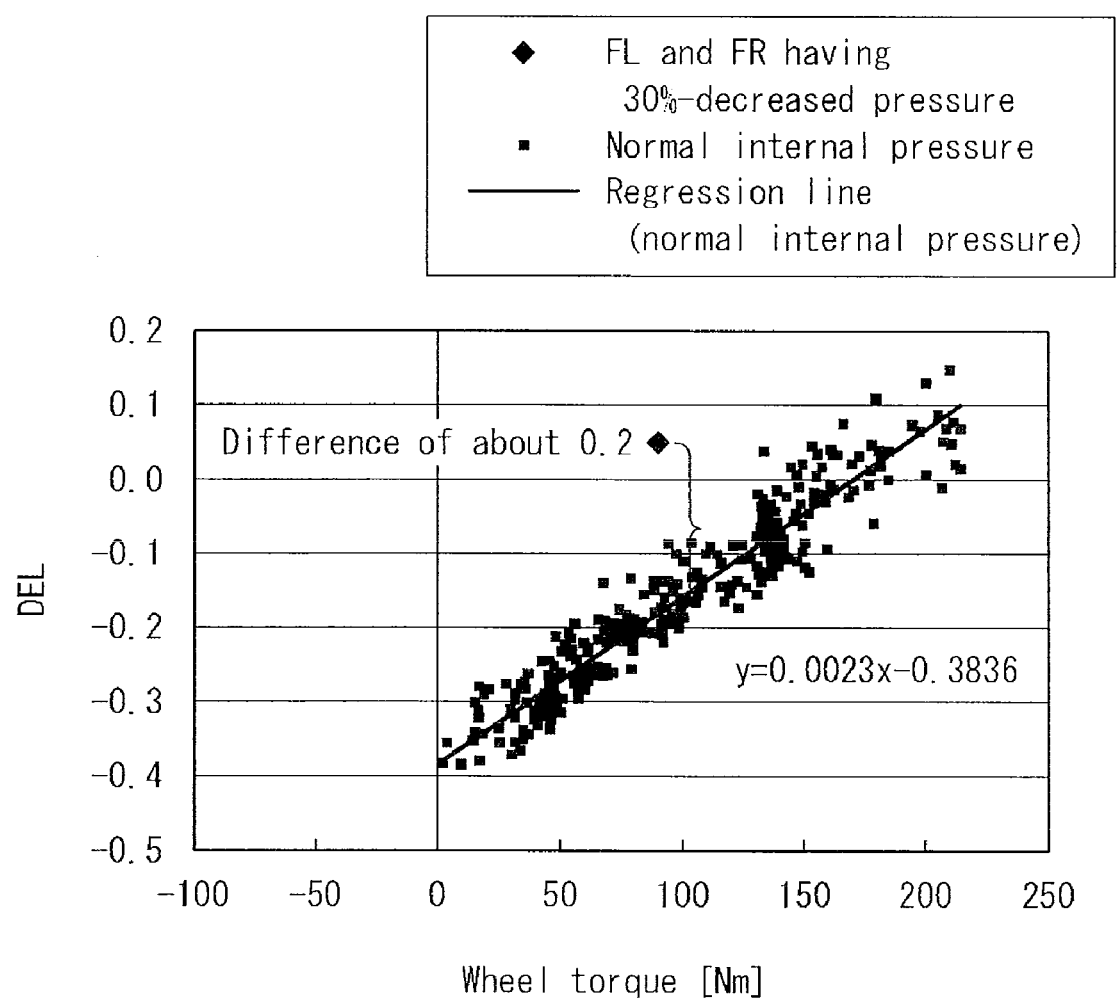
FIG. 9 shows the relation between the DEL and the wheel torque in Example 1.

The result is shown in FIG. 9. As can be seen from FIG. 9, if a regression line is calculated at a normal internal pressure and is stored in advance, even when any wheel torque value is reached at a decreased tire pressure, the decreased tire pressure can be detected only if a difference between the value at a point on the regression line at the time (the rotating wheel speed ratio DEL between the front wheels and the rear wheels) and DEL at the decreased tire pressure exceeds a predetermined threshold value. Although the threshold value is set to 0.2 in the example of FIG. 6, the threshold value is not limited to this value.

Example 2

As in Example 1, a FF vehicle was used to perform a running test. The vehicle was fitted with tires of the size of 205/60R16 but the front wheels and the rear wheels were fitted with different types of tires. Two persons including a driver were in the vehicle. The running conditions were set so that the vehicle ran at a different speed on a general road so that the wheel torque value can be dispersed at a normal internal pressure to calculate an effective regression line. In order to calculate a regression line in each speed region, the vehicle was caused to run at a speed in a low-speed region (up to 100 km/h), a medium-speed region (100 to 150 km/h), and a high-speed region (150 to 200 km/h). Next, the vehicle was caused to run at a fixed speed while both of the two front tires (left front wheel (FL) and right front wheel (FR)) had a 30%-decreased pressure.

The result is shown in FIG. 4. As can be seen from FIG. 4, if a regression line in each speed region is calculated at a normal internal pressure and is stored in advance, even when any wheel torque value is reached at a decreased tire pressure, the decreased tire pressure can be detected only if a difference between the value of a point on the regression line at the time (the rotating wheel speed ratio DEL between the front wheels and the rear wheels) and DEL at the decreased tire pressure exceeds a predetermined threshold value. However, when one regression line is drawn for all speed regions (see the thin solid line in FIG. 4), a case may be caused where no alarm is issued. Although the threshold value is set to 0.2 in the example of FIG. 4, the threshold value is not limited to this value.

How to divide the speed region is not limited to the above-described example. The speed region can be divided in various manners. For example, the speed region may be divided into two regions or four or more regions. A speed value at a random boundary between regions can also be set appropriately (in the above-described example, the region is divided into a low-speed region and a medium-speed region at 100 km/h and is divided into a medium-speed region and a high-speed region at 150 km/h).

What is claimed is:
1. An apparatus for detecting a tire attached to a vehicle having a decreased air pressure, comprising:
a rotation velocity detection means for periodically detecting rotation velocities of tires of the respective wheels of the vehicle;
a rotating wheel speed ratio calculation means for calculating, based on rotation velocity information obtained from the rotation velocity detection means, a rotating wheel speed ratio between front wheels and rear wheels of the vehicle;

a wheel torque calculation means for calculating a wheel torque of the vehicle;

an initialization means for obtaining a relation at a normal internal pressure between the wheel torque and the rotating wheel speed ratio between the front wheels and the rear wheels;

a storage means for storing the relation obtained by the initialization means;

a comparison means for comparing the rotating wheel speed ratio obtained by the rotating wheel speed ratio calculation means with the rotating wheel speed ratio at a normal internal pressure obtained from the wheel torque obtained by the wheel torque calculation means and the relation stored in the storage means; and a judgment means for judging whether a tire air pressure is decreased or not based on a comparison result by the comparison means.

2. The apparatus according to claim 1, wherein the initialization means includes a means for obtaining a relation at a normal internal pressure between the wheel torque and the rotating wheel speed ratio between the front wheels and the rear wheels based on a regression line, and the comparison means compares the rotating wheel speed ratio obtained by the rotating wheel speed ratio calculation means with the rotating wheel speed ratio at a normal internal pressure obtained from the wheel torque obtained by the wheel torque calculation means and the regression line.

3. The apparatus according to claim 1, wherein the initialization means includes a means for setting a plurality of wheel torque regions and for calculating, at a normal internal pressure, an average value of the rotating wheel speed ratios between the front wheels and the rear wheels for the respective wheel torque regions, and the comparison means compares the rotating wheel speed ratio obtained by the rotating wheel speed ratio calculation means with an average value of the rotating wheel speed ratio in a wheel torque region including the wheel torque obtained by the wheel torque calculation means.

4. The apparatus according to claim 1, wherein the initialization means includes a means for setting a plurality of wheel torque regions and for calculating, at a normal internal pressure, an average wheel torque value of the respective wheel torque regions and an average value of the rotating wheel speed ratios between the front wheels and the rear wheels, and a means for obtaining a reference straight line connecting the average values of the respective regions, and the comparison means compares the rotating wheel speed ratio obtained by the rotating wheel speed ratio calculation means with the rotating wheel speed ratio at a normal internal pressure obtained from the wheel torque obtained by the wheel torque calculation means and the reference straight line.

5. An apparatus for detecting a tire attached to a vehicle having a decreased air pressure, comprising:

a rotation velocity detection means for periodically detecting rotation velocities of tires of the respective wheels of the vehicle;

a rotating wheel speed ratio calculation means for calculating, based on rotation velocity information obtained from the rotation velocity detection means, a rotating wheel speed ratio between front wheels and rear wheels of the vehicle for a predetermined plurality of speed regions;

a wheel torque calculation means for calculating a wheel torque of the vehicle;

an initialization means for obtaining a relation at a normal internal pressure between the wheel torque and the rotating wheel speed ratio between the front wheels and the rear wheels for the respective speed regions;

a storage means for storing the relation obtained by the initialization means;

a comparison means for comparing, for the respective speed regions, the rotating wheel speed ratio obtained by the rotating wheel speed ratio calculation means with the rotating wheel speed ratio at a normal internal pressure obtained from the wheel torque obtained by the wheel torque calculation means and the relation stored by in storage means; and a judgment means for judging whether a tire air pressure is decreased or not based on a comparison result by the comparison means.

6. The apparatus according to claim 5, wherein the initialization means includes a means for obtaining, for the respective speed regions, a relation at a normal internal pressure between the wheel torque and the rotating wheel speed ratio between the front wheels and the rear wheels based on a regression line, and the comparison means compares, for the respective speed regions, the rotating wheel speed ratios obtained by the rotating wheel speed ratio calculation means with the rotating wheel speed ratio at a normal internal pressure obtained from the wheel torque obtained by the wheel torque calculation means and the regression line.

7. The apparatus according to claim 5, wherein the initialization means includes a means for setting a plurality of wheel torque regions for the respective speed regions and for calculating, at a normal internal pressure, an average value of the rotating wheel speed ratios between the front wheels and the rear wheels for the respective wheel torque regions, and the comparison means compares, for the respective speed regions, the rotating wheel speed ratio obtained by the rotating wheel speed ratio calculation means with an average value of the rotating wheel speed ratios in a wheel torque region including the wheel torque obtained by the wheel torque calculation means.

8. The apparatus according to claim 5, wherein the initialization means includes a means for setting, for the respective speed regions, a plurality of wheel torque regions, and for calculating, at a normal internal pressure, an average value of wheel torques for the respective wheel torque regions and an average value of the rotating wheel speed ratios between the front wheels and the rear wheels, and a means for obtaining a reference straight line connecting the average values of the respective regions, and the comparison means compares, for the respective speed regions, the rotating wheel speed ratio obtained by the rotating wheel speed ratio calculation means with the rotating wheel speed ratio at a normal internal pressure obtained from the wheel torque obtained by the wheel torque calculation means and the reference straight line.

9. A method for detecting a tire attached to a vehicle having a decreased air pressure, comprising:

a rotation velocity detection step of periodically detecting rotation velocities of tires of the respective wheels of the vehicle;

a rotating wheel speed ratio calculation step of calculating, based on rotation velocity information obtained in the rotation velocity detection step, a rotating wheel speed ratio between front wheels and rear wheels of the vehicle;

a wheel torque calculation step of calculating a wheel torque of the vehicle;

an initialization step of obtaining a relation at a normal internal pressure between the wheel torque and the rotating wheel speed ratio between the front wheels and the rear wheels;

a storage step of storing the relation calculated in the initialization step;

a comparison step of comparing the rotating wheel speed ratio with the rotating wheel speed ratio at a normal internal pressure obtained from the wheel torque and the stored relation; and a judgment step of judging whether a tire air pressure is decreased or not based on a comparison result obtained in the comparison step.

10. The method according to claim 9, wherein the initialization step includes a step of obtaining a relation at a normal internal pressure between the wheel torque and the rotating wheel speed ratio between the front wheels and the rear wheels based on a regression line, and the comparison step compares the rotating wheel speed ratio obtained in the rotating wheel speed ratio calculation step with the rotating wheel speed ratio at a normal internal pressure obtained from the wheel torque obtained in the wheel torque calculation step and the regression line.

11. The method according to claim 9, wherein the initialization step includes an average value calculation step of setting a plurality of wheel torque regions and of calculating, at a normal internal pressure, an average value of the rotating wheel speed ratios between the front wheels and the rear wheels for the respective wheel torque regions, and the comparison step compares the rotating wheel speed ratio obtained in the rotating wheel speed ratio calculation step with an average value of the rotating wheel speed ratio in a wheel torque region including the wheel torque obtained in the wheel torque calculation step.

12. The method according to claim 9, wherein the initialization step includes an average value calculation step of setting a plurality of wheel torque regions and of calculating, at a normal internal pressure, an average wheel torque value of the respective wheel torque regions and an average value of the rotating wheel speed ratios between the front wheels and the rear wheels, and a step of obtaining a reference straight line connecting the average values of the respective regions, and the comparison step compares the rotating wheel speed ratio obtained by the rotating wheel speed ratio calculation step with the rotating wheel speed ratio at a normal internal pressure obtained from the wheel torque obtained by the wheel torque calculation step and the reference straight line.

13. A method for detecting a tire attached to a vehicle having a decreased air pressure, comprising:

a rotation velocity detection step of periodically detecting rotation velocities of tires of the respective wheels of the vehicle;

a rotating wheel speed ratio calculation step of calculating, based on rotation velocity information obtained in the rotation velocity detection step, a rotating wheel speed ratio between front wheels and rear wheels of the vehicle for a predetermined plurality of speed regions;

a wheel torque calculation step of calculating a wheel torque of the vehicle;

an initialization step of obtaining a relation at a normal internal pressure between the wheel torque and the rotating wheel speed ratio between the front wheels and the rear wheels for the respective speed regions;

a storage step of storing the relation obtained in the initialization step;

a comparison step of comparing, for the respective speed regions, the rotating wheel speed ratio with the rotating wheel speed ratio at a normal internal pressure obtained from the wheel torque and the stored relation; and a judgment step of judging whether a tire air pressure is decreased or not based on a comparison result in the comparison step.

14. The method according to claim 13, wherein the initialization step includes a step of calculating a relation for the respective speed regions at a normal internal pressure between the wheel torque and the rotating wheel speed ratio between the front wheels and the rear wheels based on a regression line, and the comparison step compares, for the respective speed regions, the rotating wheel speed ratio obtained in the rotating wheel speed ratio calculation step with the rotating wheel speed ratio at a normal internal pressure obtained from the wheel torque obtained in the wheel torque calculation step and the regression line.

15. The method according to claim 13, wherein the initialization step includes an average value calculation step of setting a plurality of wheel torque regions for the respective speed regions and of calculating, at a normal internal pressure, an average value for the respective wheel torque regions of the rotating wheel speed ratios between the front wheels and the rear wheels, and the comparison step compares, for the respective speed regions, the rotating wheel speed ratio obtained in the rotating wheel speed ratio calculation step with an average value of the rotating wheel speed ratio in a wheel torque region including the wheel torque obtained in the wheel torque calculation step.

16. The method according to claim 13, wherein the initialization step includes an average value calculation step of setting a plurality of wheel torque regions for the respective speed regions and of calculating, at a normal internal pressure, an average wheel torque value of the respective wheel torque regions and an average value of the rotating wheel speed ratios between the front wheels and the rear wheels and, a step of obtaining a reference straight line connecting the average values of the respective regions, and the comparison step compares, for the respective speed regions, the rotating wheel speed ratio obtained in the rotating wheel speed ratio calculation step with the rotating wheel speed ratio at a normal internal pressure obtained from the wheel torque obtained in the wheel torque calculation step and the reference straight line.

17. A program for causing, in order to detect a decrease in an air pressure of a tire attached to a vehicle, a computer to function as: a rotating wheel speed ratio calculation means for calculating, based on rotation velocity information obtained from a rotation velocity detection means for periodically detecting rotation velocities of tires of the respective wheels of the vehicle, a rotating wheel speed ratio between front wheels and rear wheels of the vehicle; a wheel torque calculation means for calculating a wheel torque of the vehicle; an initialization means for obtaining a relation at a normal internal pressure between the wheel torque and the rotating wheel speed ratio between the front wheels and the rear wheels; a comparison means for comparing the rotating wheel speed ratio obtained by the rotating wheel speed ratio calculation means with the rotating wheel speed ratio at a normal internal pressure obtained from the wheel torque obtained by the wheel torque calculation means and the relation obtained by the initialization means; and a judgment means for judging whether a tire air pressure is decreased or not based on a comparison result by the comparison means.

18. The program according to claim 17, wherein the initialization means includes a means for obtaining a relation at a normal internal pressure between the wheel torque and the rotating wheel speed ratio between the front wheels and the rear wheels based on a regression line, and the comparison means compares the rotating wheel speed ratio obtained by the rotating wheel speed ratio calculation means with the rotating wheel speed ratio at a normal internal pressure obtained from the wheel torque obtained by the wheel torque calculation means and the regression line.

19. The program according to claim 17, wherein the initialization means includes a means for setting a plurality of wheel torque regions and for calculating, at a normal internal pressure, an average value of the rotating wheel speed ratios between the front wheels and the rear wheels for the respective wheel torque regions, and the comparison means compares the rotating wheel speed ratio obtained by the rotating wheel speed ratio calculation means with an average value of the rotating wheel speed ratio in a wheel torque region including the wheel torque obtained by the wheel torque calculation means.

20. The program according to claim 17, wherein the initialization means includes a means for setting a plurality of wheel torque regions and for calculating, at a normal internal pressure, an average wheel torque value of the respective wheel torque regions and an average value of the rotating wheel speed ratios between the front wheels and the rear wheels, and a means for obtaining a reference straight line connecting the average values of the respective regions, and the comparison means compares the rotating wheel speed ratio obtained by the rotating wheel speed ratio calculation means with the rotating wheel speed ratio at a normal internal pressure obtained from the wheel torque obtained by the wheel torque calculation means and the reference straight line.

21. A program for causing, in order to detect a decrease in an air pressure of a tire attached to a vehicle, a computer to function as; a rotating wheel speed ratio calculation means for calculating, based on rotation velocity information obtained from a rotation velocity detection means for periodically detecting rotation velocities of tires of the respective wheels of the vehicle, a rotating wheel speed ratio between front wheels and rear wheels of the vehicle for a predetermined plurality of speed regions; a wheel torque calculation means for calculating a wheel torque of the vehicle; an initialization means for obtaining a relation at a normal internal pressure between the wheel torque and the rotating wheel speed ratio between the front wheels and the rear wheels for the respective speed regions; a comparison means for comparing, for the respective speed regions, the rotating wheel speed ratio obtained by the rotating wheel speed ratio calculation means with the rotating wheel speed ratio at a normal internal pressure obtained from the wheel torque obtained by the wheel torque calculation means and the relation obtained by the initialization means; and a judgment means for judging whether a tire air pressure is decreased or not based on a comparison result by the comparison means.

22. The program according to claim 21, wherein the initialization means includes a means for obtaining, for the respective speed regions, a relation at a normal internal pressure between the wheel torque and the rotating wheel speed ratio between the front wheels and the rear wheels based on a regression line, and the comparison means compares, for the respective speed regions, the rotating wheel speed ratio obtained by the rotating wheel speed ratio calculation means with the rotating wheel speed ratio at a normal internal pressure obtained from the wheel torque obtained by the wheel torque calculation means and the regression line.

23. The program according to claim 21, wherein the initialization means includes a means for setting a plurality of wheel torque regions for the respective speed regions and for calculating, at a normal internal pressure, an average value of the rotating wheel speed ratios between the front wheels and the rear wheels for the respective wheel torque regions and, the comparison means compares, for the respective speed regions, the rotating wheel speed ratio obtained by the rotating wheel speed ratio calculation means with an average value of the rotating wheel speed ratio in a wheel torque region including the wheel torque obtained by the wheel torque calculation means.

24. The program according to claim 21, wherein the initialization means includes a means for setting, for the respective speed regions, a plurality of wheel torque regions and for calculating, at a normal internal pressure, an average value of wheel torques for the respective wheel torque regions and an average value of the rotating wheel speed ratios between the front wheels and the rear wheels, and a means for obtaining a reference straight line connecting the average values of the respective regions, and, the comparison means compares, for the respective speed regions, the rotating wheel speed ratio obtained by the rotating wheel speed ratio calculation means with the rotating wheel speed ratio at a normal internal pressure obtained from the wheel torque obtained by the wheel torque calculation means and the reference straight line.

\* \* \* \* \*